United States Patent [19]
Watson

[11] Patent Number: 5,303,244
[45] Date of Patent: Apr. 12, 1994

[54] FAULT TOLERANT DISK DRIVE MATRIX

[75] Inventor: M. Cameron Watson, Los Angeles, Calif.

[73] Assignees: Teradata, El Segundo, Calif.; NCR Corporation, Dayton, Ohio

[21] Appl. No.: 662,744

[22] Filed: Mar. 1, 1991

[51] Int. Cl.$^5$ .............................................. G06F 11/00
[52] U.S. Cl. ................................. 371/10.1; 395/425; 395/400; 395/575; 365/200
[58] Field of Search ............... 371/10.1, 10.2, 10.3, 371/7, 21.6, 21.1; 365/200, 201; 369/54, 58, 59; 360/22, 24, 27, 47; 395/575, 400, 425

[56] References Cited

U.S. PATENT DOCUMENTS

| | | | |
|---|---|---|---|
| 4,380,066 | 4/1983 | Spencer et al. | 371/21.6 |
| 4,953,122 | 8/1990 | Williams | 371/10.1 |
| 4,989,205 | 1/1991 | Dunphy, Jr. et al. | 371/10.1 |
| 5,025,418 | 6/1991 | Asoh | 371/10.2 |
| 5,088,081 | 2/1992 | Farr | 371/10.1 |
| 5,124,987 | 6/1992 | Milligan et al. | 371/10.1 |
| 5,146,588 | 9/1992 | Crater et al. | 371/37.1 |
| 5,210,866 | 5/1993 | Milligan et al. | 371/10.1 |

FOREIGN PATENT DOCUMENTS 0249091 10/1987 European Pat. Off.
0369707 5/1990 European Pat. Off.

OTHER PUBLICATIONS

Compcon Spring 89 "Digest of Papers" IEEE, New York, pp. 112-117.

*Primary Examiner*—Robert W. Beausoliel, Jr.
*Assistant Examiner*—Phung M. Chung
*Attorney, Agent, or Firm*—Merchant, Gould, Smith Edell, Welter & Schmidt

[57] ABSTRACT

A fault tolerant disk drive matrix comprises a plurality of disk drives. A mapping method associates a subset of the disk drives with a logical RAID-5 array. Each of the disk drives in the matrix may be associated with a plurality of different logical RAID-5 arrays. Logical units of data are subdivided into blocks and stored in an interleaved manner across the disk drives of the logical RAID-5 array. The arrangement of data and parity blocks on the logical RAID-5 arrays within the matrix reduces throughput degradation when a disk drive fails. In the event of a disk drive failure, data blocks stored on the failed disk drive can be reconstructed using redundancy blocks and data blocks from the surviving disk drives within the logical RAID-5 array. Replacement disk drives may also be provided to substitute for the failed disk drive in the logical RAID-5 array. Thus, the mapping of logical RAID-5 arrays to physical disk drives in the matrix may change in position and identity due to disk drive replacements caused by failures.

20 Claims, 2 Drawing Sheets

```
 0 0 0 0 0 0         0 0 0 2 2 2         0 0 0 1 1 1
 1 1 1 1 1 1         1 1 1 0 0 0         1 1 1 2 2 2
 2 2 2 2 2 2         2 2 2 1 1 1         2 2 2 0 0 0
```
REGION 0             REGION 1            REGION 2

```
 0 2 1 0 2 1         0 2 1 2 1 0         0 2 1 1 0 2
 1 0 2 1 0 2         1 0 2 0 2 1         1 0 2 2 1 0
 2 1 0 2 1 0         2 1 0 1 0 2         2 1 0 0 2 1
```
REGION 3             REGION 4            REGION 5

```
 0 1 2 0 1 2         0 1 2 2 0 1         0 1 2 1 2 0
 1 2 0 1 2 0         1 2 0 0 1 2         1 2 0 2 0 1
 2 0 1 2 0 1         2 0 1 1 2 0         2 0 1 0 1 2
```
REGION 6             REGION 7            REGION 8

FIG. 2

FAULT TOLERANT DISK DRIVE MATRIX

BACKGROUND OF THE INVENTION

1. Field of the Invention.

This invention relates in general to computer disk drives, and in particular, to a disk drive matrix having enhanced fault tolerance.

2. Description of Related Art.

One technique for achieving media fault tolerance involves a design termed "Redundant Arrays of Inexpensive Disks" (RAID). The RAID design offers an attractive alternative to single large expensive disk drives, promising improvements of an order of magnitude and performance, reliability, power consumption and scalability. Five levels of RAID design, termed RAID-1 through RAID-5, are known in the art and are described in the following publication, which is incorporated by reference herein: D. A. Patterson, G. Gibson, and R. H. Katz, "A Case for Redundant Arrays of Inexpensive Disks (RAID)", ACM SIGMOD Conference, Chicago, Ill., Jun. 1–3, 1988.

The RAID-1 design consists of mirrored disk drives, which are a traditional approach for improving reliability However, while such a design provides greater read throughput and fault tolerance than a single disk drive it doubles the cost of data storage.

In the RAID-2 design, a plurality of bits of a logical unit of data are striped simultaneously and in parallel across a plurality of disk drives, so that an individual read or write operation spans the entire plurality of disk drives. Parallel check disks are added to detect and correct errors. In the RAID-2 design, a single parity disk can detect a single error, but additional check disks are required to determine which disk drive failed.

The RAID-3 design is similar to the RAID-2 design, but eliminates the additional check disks of RAID-2 as being redundant, since most disk drive controllers can detect when a disk drive fails, either through special signals provided in the disk drive interface or by using error correcting codes (ECCs) stored with each sector of data. Therefore, data on a failed disk drive can be reconstructed by calculating the parity of the surviving disk drives and then comparing it bit-by-bit to the parity calculated for the original full group.

The RAID-4 design is similar to the RAID-3 design, except that a plurality of sectors of a logical unit of data are striped across a plurality of disk drives. Thus, individual reads may be performed independently, so as to maximize retrieval rates. While the RAID-4 design enhances read operations, write operations are still limited since every write operation must read and write a parity disk.

The RAID-5 design is similar to the RAID-4 design, except that placement of parity blocks is rotated among the disk drives in the array. This rotation lessens the contention for the parity disk drive during write operations experienced by the RAID-4 design. The RAID-5 design provides the random access read throughput of the RAID-1 design with the reduced redundancy cost of the RAID-3 design. However, in the presence of a failure, the random read throughput of the RAID-5 design drops by 50% because the corresponding data and parity sectors on all surviving disk drives must be read to reconstruct the data sectors on the failed disk drive.

SUMMARY OF THE INVENTION

To overcome the limitations in the prior art described above, and to overcome other limitations that will become apparent upon reading and understanding the present specification, the present invention discloses a fault tolerant disk drive matrix comprising a plurality of disk drives. A mapping method associates a subset of the disk drives with a logical RAID-5 array. Each of the disk drives in the matrix may be associated with a plurality of different logical RAID-5 arrays. Logical units of data are subdivided into blocks and stored in an interleaved manner across the disk drives of the logical RAID-5 array. The arrangement of data and parity blocks on the logical RAID-5 arrays within the matrix reduces throughput degradation when a disk drive fails. In the event of a disk drive failure, data blocks stored on the failed disk drive can be reconstructed using redundancy blocks and data blocks from the surviving disk drives within the logical RAID-5 array. Replacement disk drives may also be provided to substitute for the failed disk drive in the logical RAID-5 array. Thus, the mapping of logical RAID-5 arrays to physical disk drives in the matrix may change in position and identity due to disk drive replacements caused by failures.

BRIEF DESCRIPTION OF THE DRAWINGS

Referring now to the drawings in which like reference numbers represent corresponding parts throughout:

FIG. 2 is a block diagram illustrating the mapping method for determining the arrangement of logical RAID-5 arrays in the matrix.

DETAILED DESCRIPTION OF THE PREFERRED EMBODIMENT

Figure 1:
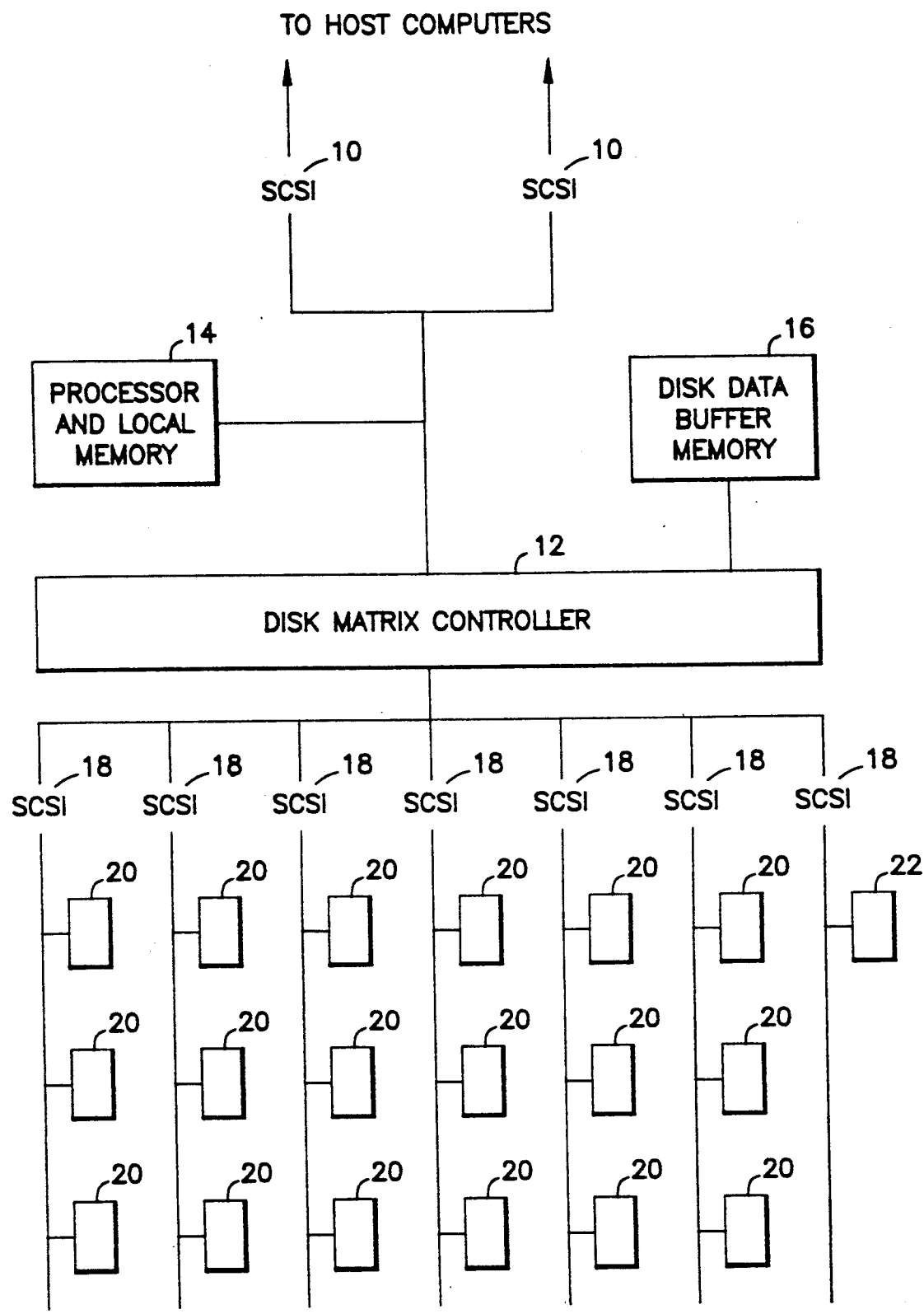
FIG. 1 is a block diagram illustrating the components of a disk drive matrix.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

To capitalize fully on the benefits of disk drive arrays, the present invention discloses a disk drive matrix comprising a plurality of disk drives, wherein a mapping method associates a subset of the disk drives with a logical RAID-5 array. Each of the disk drives in the matrix may be associated with a plurality of different logical RAID-5 arrays. For example, horizontal associations and diagonal associations of disk drives within the matrix may be chosen as logical RAID-5 arrays. (Vertical associations can also be used, but would typically be excluded to eliminate a single point of failure on a disk drive bus.) Logical units of data are subdivided into blocks and stored in an interleaved manner across the disk drives of the logical RAID-5 array. The arrangement of data and parity blocks on the logical RAID-5 arrays within the matrix reduces throughput degradation when a disk drive fails. In the event of a disk drive failure, data blocks stored on the failed disk drive can be reconstructed using redundancy blocks and data blocks from the surviving disk drives within the logical RAID-5 array. Replacement disk drives may also be provided to substitute for the failed disk drive in the logical RAID-5 array. Thus, the mapping of logical RAID-5 arrays to physical disk drives in the matrix may change in position and identity due to disk drive replacements caused by failures.

Refer now to FIG. 1, which is a block diagram of the components used in an exemplary system practicing the present invention. The exemplary system comprises a 3×6 matrix, wherein each logical RAID-5 array spans six disk drives 20 in the matrix and each of the six disk drives 20 stores one "logical cylinder." In the exemplary system, five of the logical cylinders comprise data and the sixth logical cylinder comprises redundancy information, i.e., parity.

Two host SCSI interfaces 10, each having a twenty megabyte per second transfer rate, connect the matrix to one or more host computers (not shown), for which the data is being read and written. A microprocessor 14 interprets commands from the host computers and coordinates the activities of a matrix controller 12.

The controller 12 contains logic which allows commands and data blocks to be moved between the host computer and a buffer memory 16. The memory 16 preferably comprises enough storage to hold a set of three typical data blocks for each of the eighteen active disk drives 20; one megabyte is a plausible value.

The controller 12 also contains logic which allows commands and data blocks to be moved between disk drives 20 and the memory 16. The disk drives 20 are connected to the controller 12 via disk SCSI interfaces 18, each having a ten megabyte per second transfer rate. Each of the disk drives 20 may have embedded controllers with buffers therein large enough to hold a typical data block. The spindles of the disk drives 20 need not be synchronized.

To expand the storage capacity, additional disk drives 20 can be added. To minimize buffer contention, the size of the memory 16 should be increased to handle the additional disk drives 20. To enhance fault tolerance, all components described above, except the SCSI interfaces 18 and disk drives 20, may be duplicated. To minimize the mean time to rebuild, an additional column with one or more replacement disk drives 22 can be added.

OPERATION OF THE DISK DRIVE MATRIX

In the exemplary system, a typical read operation generates one data transfer request from the microprocessor 14 through the controller 12 to the data disk drive 20; a typical write operation generates four data transfer requests from the microprocessor 14 through the controller 12 to the data and parity disk drives 20, i.e., two read requests for the old data and parity, and two write requests for the new data and parity.

READS

When all disk drives 20 in a logical RAID-5 array are available, a data block is retrieved by reading the disk drive 20 on which it resides. When a disk drive 20 in the logical RAID-5 array fails, a data block on the failed disk drive 20 is reconstructed by performing an exclusive-OR operation on the data blocks and parity block from the surviving disk drives 20 in the logical RAID-5 array.

If the read operation specifies a very large data block, or a data block which crosses a logical cylinder boundary, the read may be broken into two or more smaller operations.

READ WITHOUT A DISK DRIVE FAILURE

The read operation maps the host computer address of the data block into the corresponding SCSI logical block address on the data disk drive 20. When the data disk drive 20 becomes available, the microprocessor 14 allocates a buffer in the memory 16 and sends the data disk drive 20 a SCSI read command. When the SCSI read command completes, the data block is transferred to the memory 16, then back to the host computer. Finally, the microprocessor 14 notifies the host computer and releases the buffer.

READ WITH A DATA DISK DRIVE FAILURE

When a data disk drive 20 in a logical RAID-5 array fails, the microprocessor 14 allocates five buffers in the memory 16 and the read operation is raised in priority. The buffers are allocated initially as a simple way of managing deadlock; the priority boost minimizes response time variance. As each of the surviving data and parity disk drives 20 in the logical RAID-5 array becomes available, the microprocessor 14 sends it a SCSI read command. When the SCSI read command completes, the data block or parity block is transferred to the memory 16. When all five buffers in the memory 16 have been filled, an exclusive-OR operation is performed on the buffers to reconstruct the data block from the failed disk drive 20. The reconstructed data block is then transferred to the host computer. Finally, the microprocessor 14 notifies the host computer and releases the buffers.

WRITES

When all disk drives 20 in a logical RAID-5 array are available, a data block is stored by: (1) reading the old data block from the data disk drive 20, (2) writing the new data block onto the data disk drive 20, (3) reading the old parity block from the parity disk drive 20, and (4) writing the exclusive-OR of the old data block, the new data block, and the old parity block onto the parity disk drive 20. These steps maintain the parity block so that reconstruction can be performed when a disk drive 20 in the logical RAID-5 array fails.

When a data disk drive 20 in a logical RAID-5 array fails, the surviving four data disk drives 20 in the logical RAID-5 array are read and the data blocks therefrom are exclusive-ORed with the new data block to generate the new parity block. When the parity disk drive 20 in the logical RAID-5 array fails, the data disk drives 20 are updated and the parity disk drive 20 is ignored.

If the write operation specifies a very large data block, or a data block which crosses a logical cylinder boundary, the write operation may be broken into two or more smaller write operations.

WRITE WITHOUT A DISK DRIVE FAILURE

The write operation maps the host computer address of the data block into the corresponding SCSI logical block addresses on the data and parity disk drives 20. The microprocessor 14 allocates three buffers in the memory 16 and the new data block is transferred from the host computer to the first buffer. When the data disk drive 20 becomes available, the microprocessor 14 sends it SCSI read and write commands. When the SCSI read command completes, the old data block is transferred to the second buffer and the new data block is transferred to the data disk drive 20. When the parity disk drive 20 becomes available, the microprocessor 14 sends it SCSI read and write commands. When the SCSI read command completes, the old parity block is transferred to the third buffer and the new parity block, which is the exclusive-OR of the three buffers, is transferred to the parity disk drive 20. Finally, the microprocessor 14 notifies the host computer and releases the buffers.

When a primary controller 12, microprocessor 14, or memory 16 fails during a write operation, the state of the blocks on the data and parity disk drives 20 may be indeterminate. If the matrix has a redundant set of these components, each outstanding write operation is reissued to the redundant controller 12. The parity block is then generated from the ne data block and the other data disk drives 20 (as in the following subsection) rather than from the (indeterminate) parity block.

WRITE WITH A DATA DISK DRIVE FAILURE

When a data disk drive 20 in a logical RAID-5 array fails, the microprocessor 14 allocates five buffers in the memory 16 and the write operation is raised in priority. The new data block is transferred from the host computer into one of the buffers. As each of the four surviving data disk drives 20 in the logical RAID-5 array becomes available, the microprocessor 14 sends it a SCSI read command. When all buffers have been filled, an exclusive-OR operation is performed on the buffers to construct the new parity block. When the parity disk drive 20 becomes available, the microprocessor 14 sends it a SCSI write command and the new parity block. Finally, the microprocessor 14 notifies the host computer and releases the buffers.

WRITE WITH A PARITY DISK DRIVE FAILURE

When the parity disk drive 20 in a logical RAID-5 array fails, the update of the parity block is ignored. The new data block is transferred from the host computer to a buffer allocated in the memory 16. When the data disk drive 20 becomes available, the controller 12 sends it a SCSI write command and the new data block. Finally, the microprocessor 14 notifies the host computer and releases the buffer.

REPLACEMENT DISK DRIVES

When the matrix includes a replacement disk drive 22, the contents of a failed disk drive 20 may be rebuilt on it. The steps of the rebuild operation depend upon whether a parity disk drive 20 or a data disk drive 20 within a logical RAID-5 array has failed.

For each logical RAID-5 array using the failed disk drive 20 as a data disk drive 20, the rebuild operation must read the surviving data disk drives 20 and parity disk drive 20, reconstruct the desired data block, and store the reconstructed data block on the replacement disk drive 22.

For each logical RAID-5 array using the failed disk drive 20 as a parity disk drive 20, the rebuild operation must read the surviving data disk drives 20, reconstruct the desired parity block, and store the reconstructed parity block on the replacement disk drive 22.

As the rebuild operation proceeds, writes to logical RAID-5 arrays with the failed disk drive 20 must also update the replacement disk drive 22. A write to a data block which spans both rebuilt and unrebuilt sectors must update both the rebuilt sectors on the replacement disk drive 22 and the unrebuilt sectors on the parity disk drive 20. Reads to logical RAID-5 arrays with the failed disk drive 20 can be re-directed to replacement disk drive 22, or can use the reconstruction methods mentioned above.

A MAPPING METHOD

As mentioned above, the exemplary 3×6 matrix supports a plurality of logical RAID-5 arrays, wherein each logical RAID-5 array spans six disk drives 20 and each disk drive 20 stores one logical cylinder. The microprocessor 14 uses a mapping method to determine which disk drives 20 belong to a particular logical RAID-5 array. The following description of the mapping method used in the preferred embodiment is only presented for the purposes of illustration and description. The description is not intended to be exhaustive, nor is the invention limited to the precise mapping method disclosed. Those skilled in the art will recognize that there are many possible mapping methods for creating logical arrays using a subset of disk drives from a larger pool of disk drives 20.

A mapping method for the 3×6 matrix of the exemplary system is best illustrated with reference to FIG. 2. Each of the nine "regions" in FIG. 2 illustrates three logical RAID-5 arrays, wherein the disk drives 20 associated with each logical RAID-5 array are denoted by '0', '1', and '2', respectively. The mapping method distributes the redundancy information, e.g., parity, for any disk drive 20 in any column uniformly across all of the disk drives 20 in the remaining columns.

In Regions 0–2, the logical RAID-5 arrays therein comprise three possible permutations of the three horizontal combinations of the left three disk drives 20 with the three horizontal combinations of the right three disk drives 20.

In Regions 3–5, the logical RAID-5 arrays therein comprise three possible permutations of the three downward diagonal combinations of the left three disk drives 20 with the three downward diagonal combinations of the right three disk drives 20.

In Regions 6–8, the logical RAID-5 arrays therein comprise three possible permutations of the three upward diagonal combinations of the left three disk drives 20 with the three upward diagonal combinations of the right three disk drives 20.

The following formulae are used in read and write operations to map a data address received from the host computer into a logical data cylinder, and to map a logical unit number received from the host computer into a column number and a row number of the matrix identifying a data disk drive 20 in the matrix:

HosCyl = HosAdr/CylSize
DatCyl = HosCyl + HosCyl/(Width − Redund) * Redund
DatCol = HosLun % Width
DatRow = HosLun/Width wherein:

(a) HosAdr is the data address received from the host computer, (b) CylSize is a logical cylinder size in the logical RAID-5 array, (c) HosCyl is a cylinder computed from the data address received from the host computer, (d) HosLun is the logical unit number received from the host computer, (e) DatCyl is the logical data cylinder, (f) DatCol is the column number identifying the data disk drive 20, (g) DatRow is the row number identifying the data disk drive 20, (h) Width is a width for the matrix, e.g., 6 in the preferred embodiment, (i) Redund is a total number of redundancy disk drives 20 in a logical RAID-5 array, e.g., a single parity disk drive 20 in the preferred embodiment, (j) operator "/" indicates integer divide with truncation, (k) operator "*" indicates multiplication, and (l) operator "%" indicates modulo divide.

The above formulae map read and write operations without a disk drive 20 failure. For brevity and clarity, the additional mapping required when the data disk drive 20 has been rebuilt on a replacement disk drive 22 is not shown. Those skilled in the art will recognize that when the row number and the column number correspond to a failed data disk drive 20 a replacement disk drive 22 is used instead.

The following formulae are used in read and write operations to map the logical data cylinder (computed above) into a logical parity cylinder, and to map the column number and the row number of the matrix identifying the data disk drive 20 (computed above) into a column number and a row number of the matrix identifying a parity disk drive 20:

ParCyl = (DatCyl/Width) * Width + (Width − 1)
ParCol = (DatCyl + DatCol + 1) % Width
NumReg = Depth ** ((Width + Depth − 1)/Depth)
Region = (ParCyl/Width) % NumReg
Angle = Region/Depth
Offset = Region % Depth
DatSide = DatCol/Depth
ParSide = ParCol/Depth
ParRow = (DatRow + Angle * (DatCyl + 1) + (if DatSide < ParSide then Offset else 0) + (if DatSide > ParSide then Depth-Offset else 0)) % Depth wherein:

(a) ParCyl is the logical parity cylinder, (b) ParCol is the column number identifying the parity disk drive 20, (c) Depth is a depth of the matrix, e.g., 3 disk drives in the preferred embodiment, (d) NumReg is a total number of Regions, e.g., 9 in the preferred embodiment as illustrated in FIG. 2, (e) Region identifies a region 0-8 as illustrated in FIG. 2 for the preferred embodiment, (f) Angle is horizontal (0), downward (1), or upward (2) as illustrated in FIG. 2 for the preferred embodiment, (g) Offset identifies an offset, in rows, of the angle pattern in the right three disk drives 20 from the angle pattern of the left three disk drives 20, as illustrated in FIG. 2 for the preferred embodiment, (h) DatSide is 1 if the data disk drive 20 is one of the disk drives 20 in the right three columns or 0 otherwise, as illustrated in FIG. 2 for the preferred embodiment, (i) ParSide is 1 if the parity disk drive 20 is one of the disk drives 20 in the right three columns or 0 otherwise, as illustrated in FIG. 2 for the preferred embodiment, (j) ParRow is the row number identifying the parity disk drive 20, and (k) operator "**" indicates exponentiation.

The above formulae map read and write operations without a disk drive 20 failure. For brevity and clarity, the additional mapping required when a parity disk drive 20 has been rebuilt on a replacement disk drive 22 is not shown. Those skilled in the art will recognize that when the row number and the column number correspond to a failed parity disk drive 20, a replacement disk drive 22 is used instead.

The following examples describe the results of the mapping method in the exemplary 3 × 6 matrix, wherein the width is 6, the depth is 3, single redundancy is used, and the cylinder size is 1 megabyte, i.e., 1,048,576 bytes.

Assume the host computer wants to write a data block at byte address 232,000 on logical unit number 0:

HosAdr = 232,000
HosLun = 0
CylSize = 1,048,576
HosCyl = 0

Then, these are mapped to following logical data cylinder, column number, and row number:

DatCyl = 0
DatCol = 0
DatRow = 0

The associated logical parity cylinder, column number, and row number are:

ParCyl = 5
ParCol = 1
NumReg = 9
Region = 0
Angle = 0
Offset = 0
DatSide = 0
Parside = 0
ParRow = 0

For a more complex example, assume the host computer wants to write a data block at byte address 54,757,952 on logical unit 12:

HosLun = 12
HosAdr = 54,757,952
CylSize = 1,048,576
HosCyl = 52

Then, these are mapped to the following logical data cylinder, column number, and row number:

DatCyl = 62
DatCol = 0
DatRow = 2

The associated logical parity cylinder, column number, and row number are:

ParCyl = 65
ParCol = 3
NumReg = 9
Region = 1
Angle = 0
Offset = 1
DatSide = 0
Parside = 1
ParRow = 0

Those skilled in the art will recognize that alternative methods could be used for storing parity. For example, parity blocks could be rotated among disk drives 20 within a logical RAID-5 array using a different method, or parity blocks could be fixedly located on one particular disk drive 20 within a logical RAID-5 array, e.g., the last disk drive 20 in the logical RAID-5 array.

When a disk drive 20 has failed, and when its contents has been rebuilt on a replacement disk drive 22, then the mapping method replaces the failed disk drive 20 with the replacement disk drive 22. All references to disk drives 20 include replacement disk drives 22 which are active replacements.

Those skilled in the art will recognize that each disk drive 20 in the matrix could be associated with a large number of unique logical RAID-5 arrays. Further, the mapping method described herein ca be extended or truncated for use with matrices and logical RAID-5 arrays of any size. Also, additional redundancy can be incorporated to recover from failures of more than one disk drive 20. The characteristics of the exemplary 3×6 matrix described herein are provided for the purposes of illustration only.

ALTERNATIVE EMBODIMENTS

This concludes the description of the preferred embodiment of the invention. The following paragraphs describe some alternative embodiments of the present invention.

Different matrix dimensions could be substituted for the 3×6 matrix described in the preferred embodiment. The primary impact on the mapping method would be in the computations for the parity disk drive 20. Note that the Width, Depth, NumReg, Region, Angle, Offset, DatSide, and ParSide variables would represent different configurations and values from the examples shown above.

For example, if the Depth is a prime number and the Width is less than or equal to the Depth, but not less than 2, then DatCyl, DatCol, DatRow, ParCyl, and ParCol would be computed as described above, but ParRow would be calculated as:

Region=(DatCyl/Width) % NumReg
ParRow=(DatRow+Region * (Datcyl+1)) % Depth

If the Depth is a prime number and the Width is greater than the Depth, but less than or equal to twice the Depth, then DatCyl, DatCol, DatRow, ParCyl, and ParCol would be computed as described above, but ParRow would be calculated as:

Region=(DatCyl/Width) % NumReg
Angle=Region/Depth
Offset=Region % Depth
DatSide=DatCol/Depth
ParSide=ParCol/Depth
ParRow=(DatRow+Angle * (Datcyl+1)) +(if DatSide<ParSide then Offset else 0) +(if DatSide>ParSide then Depth-Offset else 0)) % Depth Those skilled in the art will recognize that there are many possible permutations to the above formulae. The formulae are presented for the purposes of illustration and description only, and are not intended to be exhaustive.

In addition to permutations based on different matrix dimensions, alternative methods for mapping redundancy information in the logical arrays could be substituted for the method described in the preferred embodiment.

For example, two redundancy disk drives 20, i.e., a parity disk drive 20 and a quotient disk drive 20, could be used rather than a single redundancy disk drive 20, i.e., the parity disk drive 20. The following formulae are used in read and write operations to map a logical data cylinder into a logical parity cylinder and a logical quotient cylinder, and to map a column and row of the matrix identifying a data disk drive 20 into a column and row of the matrix identifying a parity disk drive 20 and a column and row of the matrix identifying a quotient disk drive 20:

ParCyl=(DatCyl/Width) * Width+(Width−1)
QuoCyl=(DatCyl/Width) * Width+(Width−2)
ParCol=(DatCyl+DatCol+1) % Width
QuoCol=(DatCyl+DatCol+2) % Width
NumReg=Depth ** ((Width+Depth−1)/Depth)
Region=(DatCyl/Width) % NumReg
ParRow=(DatRow+Region * (DatCyl+1)) % Depth
QuoRow=(DatRow+Region * (DatCyl+2)) % Depth wherein:
ParCyl is the logical parity cylinder,
ParCol is the column number identifying the parity disk drive 20,
ParRow is the row number identifying the parity disk drive 20,
QuoCyl is the logical quotient cylinder,
QuoCol is the column number identifying the quotient disk drive 20, and
QuoRow is the row number identifying the quotient disk drive 20 in the matrix.

Further, different matrix dimensions would also have an impact on the mapping method for the parity and quotient disk drives 20. Note also that the Width, Depth, NumReg, Region, Angle, Offset, DatSide, ParSide, and QuoSide variables would be different from the examples shown above.

For example, if the Depth is a prime number and the Width is less than or equal to the Depth, but not less than 4, then the DatCyl, DatCol, DatRow, ParCyl, ParCol, QuoCyl, and QuoCol would be computed as described above, but the ParRow and QuoRow would be calculated as:

Region=(DatCyl/Width) % NumReg
ParRow=(DatRow+Region * (DatCyl+1)) % Depth
QuoRow=(DatRow+Region * (DatCyl+2)) % Depth If the Depth is a prime number and the Width is greater than the Depth, but less than or equal to twice the Depth, then the DatCyl, DatCol, DatRow, ParCyl, ParCol, QuoCyl, and QuoCol would be computed as described above, but the ParRow and QuoRow would be calculated as:

Region=(DatCyl/Width) % NumReg
Angle=Region/Depth
Offset=Region % Depth
DatSide=DatCol/Depth
ParSide=ParCol/Depth
QuoSide=QuoCol/Depth
ParRow=(DatRow+Angle * (DatCyl+1)) +(if DatSide<ParSide then Offset else 0) +(if DatSide>ParSide then Depth-Offset else 0)) % Depth
QuoRow=(DatRow+Angle * (DatCyl+2)) +(if DatSide<ParSide then Offset else 0) +(if DatSide>ParSide then Depth-Offset else 0)) % Depth As with the single redundancy disk drive 20, those skilled in the art will recognize that there are many possible permutations to the above formulae. The formulae are presented for the purposes of illustration and description only, and are not intended to be exhaustive.

CONCLUSION

In summary, a fault tolerant disk drive matrix comprising a plurality of disk drives has been described. A mapping method associates a subset of the disk drives with a logical RAID-5 array. Each of the disk drives in the matrix may be associated with a plurality of different logical RAID-5 arrays. Logical units of data are subdivided into blocks and stored in an interleaved manner across the disk drives of the logical RAID-5 array. The arrangement of data and parity blocks on the logical RAID-5 arrays within the matrix reduces throughput degradation when a disk drive fails. In the event of a disk drive failure, data blocks stored on the failed disk drive can be reconstructed using redundancy blocks and data blocks from the surviving disk drives within the logical RAID-5 array. Replacement disk drives may also be provided to substitute for the failed disk drive in the logical RAID-5 array. Thus, the mapping of logical RAID-5 arrays to physical disk drives in the matrix may change in position and identity due to disk drive replacements caused by failures.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A data storage device for a computer, comprising:
   (a) a plurality of disk drives arranged in a matrix, wherein each disk drive therein is identified by a row and column intersection of the matrix;
   (b) mapping means for associating a subset of the plurality of disk drives with a logical array, wherein each of the disk drives belongs to a plurality of different logical arrays, the mapping means further comprising means for mapping a logical unit number received from the computer into a column number and a row number of the matrix identifying a disk drive; and
   (c) storage means for subdividing a logical unit of data into blocks and storing the blocks in an interleaved manner across the disk drives associated with the logical array.

2. The data storage device of claim 1, wherein the logical arrays are RAID-5 arrays.

3. The data storage device of claim 1, further comprising:
   (d) at least one replacement disk drive; and
   (e) means for substituting the replacement disk drive for a failed disk drive in the logical array.

4. The data storage device of claim 3, further comprising:
   (f) means for reconstructing data blocks stored on the failed disk drive using redundancy blocks and data blocks from surviving disk drives within the logical array.

5. The data storage device of claim 1, wherein the mapping means comprises:
   (1) means for mapping a data address received from the computer into a logical data cylinder, according to formulae:
   HosCyl = HosAdr/CylSize
   DatCyl = HosCyl + HosCyl/(Width − Redund) * Redund
   (2) means for mapping the logical unit number received from the computer into the column number and the row number of the matrix identifying the data disk drive, according to the formulae:
   DatCol = HosLun % Width
   DatRow = HosLun/Width
   wherein:
   HosAdr is the data address received from the computer,
   CylSize is a logical cylinder size,
   HosCyl is a cylinder address computed from the data address received from the computer,
   HosLun is the logical unit number received from the computer,
   DatCyl is the logical data cylinder,
   DatCol is the column number identifying the data disk drive,
   DatRow is the row number identifying the data disk drive,
   Width is a width of the matrix,
   Redund is a total number of redundancy disk drives in the logical array,
   operator "/" indicates integer divide with truncation,
   operator "*" indicates multiplication, and
   operator "%" indicates modulo divide.

6. The data storage device of claim 5, further comprising:
   (3) means for mapping the logical data cylinder into a logical redundancy cylinder, according to the formula:
   ParCyl = (DatCyl/Width) * Width + (Width − Redund)
   (4) means for mapping the logical data cylinder and the column number and the row number of the matrix identifying the data disk drive into a column number and a row number of the matrix identifying a redundancy disk drive, according to the formulae:
   ParCol = (DatCyl + DatCol + 1) % Width
   NumReg = Depth ** ((Width + Depth − 1)/Depth)
   Region = (ParCyl/Width) % NumReg
   Angle = Region/Depth
   Offset = Region % Depth
   DatSide = DatCol/Depth
   ParSide = ParCol/Depth
   ParRow = (DatRow + Angle * (DatCyl + 1) + (if DatSide < ParSide then Offset else 0) + (if DatSide > ParSide then Depth-Offset else 0)) % Depth
   wherein:
   ParCyl is the logical redundancy cylinder,
   ParCol is the column number identifying the redundancy disk drive,
   ParRow is the row number identifying the redundancy disk drive,
   Depth is a depth of the matrix,
   NumReg, Region, Angle, Offset, DatSide, and ParSide are computational terms, and
   operator "**" indicates exponentiation.

7. The data storage device of claim 5, further comprising:
   (3) means for mapping the logical data cylinder into a logical redundancy cylinder, according to the formula:
   ParCyl = (DatCyl/Width) * Width + (Width − Redund)
   (4) means for mapping the logical data cylinder and the column number of the matrix identifying the data disk drive into a column number of the matrix identifying a redundancy disk drive, according to the formula:
   ParCol = (DatCyl + DatCol + 1) % Width
   (5) means for mapping the logical data cylinder and the row number of the matrix identifying the data disk drive into a row number of the matrix identifying the redundancy disk drive, according to the formulae:
   NumReg = Depth ** ((Width + Depth − 1)/Depth)
   Region = (DatCyl/Width) % NumReg
   ParRow = (DatRow + Region * (DatCyl + 1)) % Depth wherein:
Redund is equal to 1,
Depth is a depth of the matrix and is a prime number,
Width is less than or equal to the Depth, but not less than 2,
ParCyl is the logical redundancy cylinder,
ParCol is the column number identifying the redundancy disk drive,
ParRow is the row number identifying the redundancy disk drive,
NumReg and Region are computational terms, and
operator "**" indicates exponentiation.

8. The data storage device of claim 5, further comprising:
(3) means for mapping the logical data cylinder into a logical redundancy cylinder, according to the formula:
ParCyl = (DatCyl/Width) * Width + (Width − Redund)
(4) means for mapping the logical data cylinder and the column number of the matrix identifying the data disk drive into a column number of the matrix identifying a redundancy disk drive, according to the formula:
ParCol = (DatCyl + DatCol + 1) % Width
(5) means for mapping the logical data cylinder and the row number of the matrix identifying data disk drive into a row number of the matrix identifying the redundancy disk drive, according to the formulae:
NumReg = Depth ** ((Width + Depth − 1)/Depth)
Region = (DatCyl/Width) % NumReg
Angle = Region/Depth
Offset = Region % Depth
DatSide = DatCol/Depth
ParSide = ParCol/Depth
ParRow = (DatRow + Angle * (DatCyl + 1) + (if DatSide < ParSide then Offset else 0) + (if DatSide > ParSide then Depth − Offset else 0)) % Depth
wherein:
Redund is equal to 1,
Depth is a depth of the matrix and is a prime number,
Width is greater than the Depth, but less than or equal to twice the Depth,
ParCyl is the logical redundancy cylinder,
ParCol is the column number identifying the redundancy disk drive,
ParRow is the row number identifying the redundancy disk drive,
NumReg, Region, Angle, Offset, DatSide, and ParSide are computational terms, and
operator "**" indicates exponentiation.

9. The data storage device of claim 5, further comprising:
(3) means for mapping the logical data cylinder into a logical parity cylinder and a logical quotient cylinder, according to the formulae:
ParCyl = (DatCyl/Width) * Width + (Width − 1)
QuoCyl = (DatCyl/Width) * Width + (Width − 2)
(4) means for mapping the logical data cylinder and the column number of the matrix identifying the data disk drive into a column number of the matrix identifying a parity disk drive and a column number of the matrix identifying a quotient disk drive, according to the formulae:
ParCol = (DatCyl + DatCol + 1) % Width
QuoCol = (DatCyl + DatCol + 2) % Width
(5) means for mapping the logical data cylinder and the row number of the matrix identifying the data disk drive into a row number of the matrix identifying the parity disk drive and a row number of the matrix identifying the quotient disk drive, according to the formulae:
NumReg = Depth ** ((Width + Depth − 1)/Depth)
Region = (DatCyl/Width) % NumReg
ParRow = (DatRow + Region * (DatCyl + 1)) % Depth
QuoRow = (DatRow + Region * (DatCyl + 2)) % Depth
wherein:
Redund is equal to 2,
Depth is a depth of the matrix and is a prime number,
Width is less than or equal to the Depth, but not less than 4,
ParCyl is the logical parity cylinder,
ParCol is the column number identifying the parity disk drive,
ParRow is the row number identifying the parity disk drive,
QuoCyl is the logical quotient cylinder,
QuoCol is the column number identifying the quotient disk drive,
QuoRow is the row number identifying the quotient disk drive,
NumReg and Region are computational terms, and
operator "**" indicates exponentiation.

10. The data storage device of claim 5, further comprising:
(3) means for mapping the logical data cylinder into a logical parity cylinder and a logical quotient cylinder, according to the formulae:
ParCyl = (DatCyl/Width) * Width + (Width − 1)
QuoCyl = (DatCyl/Width) * Width + (Width − 2)
(4) means for mapping the logical data cylinder and the column number of the matrix identifying the data disk drive into a column number of the matrix identifying a parity disk drive and a column number of the matrix identifying a quotient disk drive, according to the formulae:
ParCol = (DatCyl + DatCol + 1) % Width
QuoCol = (DatCyl + DatCol + 2) % Width
(5) means for mapping the logical data cylinder and the row number of the matrix identifying the data disk drive into a row number of the matrix identifying the parity disk drive and a row number of the matrix identifying the quotient disk drive, according to the formulae:
NumReg = Depth ** ((Width + Depth − 1)/Depth)
Region = (DatCyl/Width) % NumReg
Angle = Region/Depth
Offset = Region % Depth
DatSide = DatCol/Depth
ParSide = ParCol/Depth
QuoSide = QuoCol/Depth
ParRow = (DatRow + Angle * (DatCyl + 1) + (if DatSide < ParSide then Offset else 0) + (if DatSide > ParSide then Depth − Offset else 0)) % Depth
QuoRow = (DatRow + Angle * (DatCyl + 2) + (if DatSide < QuoSide then Offset else 0) + (if DatSide > QuoSide then Depth − Offset else 0)) % Depth
wherein:
Redund is equal to 2,
Depth is a depth of the matrix and is a prime number, Width is greater than the Depth but less than or equal to twice the Depth, ParCyl is the logical parity cylinder, ParCol is the column number identifying the parity disk drive, ParRow is the row number identifying the parity disk drive, QuoCyl is the logical quotient cylinder, QuoCol is the column number identifying the quotient disk drive, QuoRow is the row number identifying the quotient disk drive, NumReg, Region, Angle, Offset, DatSide, ParSide, and QuoSide are computational terms, and operator "**" indicates exponentiation.

11. A method of storing data for a computer on a plurality of disk drives, comprising:

(a) arranging the disk drives in a matrix, wherein each disk drive therein is identified by a row and column intersection of the matrix;

(b) associating a subset of the plurality of disk drives with a logical array, wherein each of the disk drives is associated with a plurality of different logical arrays, the associating step further comprising mapping a logical unit number received from the computer into a column number and a row number of the matrix identifying a data disk drive; and (c) subdividing a logical unit of data into blocks and storing the blocks in an interleaved manner across the disk drives associated with the logical array.

12. The method of claim 11, wherein the logical arrays are RAID-5 arrays.

13. The method of claim 11, further comprising:

(d) substituting at least one replacement disk drive for a failed disk drive in the logical array.

14. The method of claim 13, further comprising:

(e) reconstructing data blocks stored on the failed disk drive using redundancy blocks and data blocks from surviving disk drives within the logical array.

15. The method of claim 11, wherein the associating step comprises:

(1) mapping a data address received from the computer into a logical data cylinder, according to formulae:

HosCyl = HosAdr/CylSize

DatCyl = HosCyl + HosCyl/(Width − Redund) * Redund (2) mapping the logical unit number received from the computer into the column number and the row number of the matrix identifying the data disk drive, according to the formulae:

DatCol = HosLun % Width

DatRow = HosLun/Width wherein:

HosAdr is the data address received from the computer,

CylSize is a logical cylinder size,

HosCyl is a cylinder address computed from the data address received from the computer, HosLun is the logical unit number received from the computer, DatCyl is the logical data cylinder, DatCol is the column number identifying the data disk drive, DatRow is the row number identifying the data disk drive, Width is a width of the matrix, Redund is a total number of redundancy disk drives in the logical array, operator "/" indicates integer divide with truncation, operator "*" indicates multiplication, and operator "%" indicates modulo divide.

16. The method of claim 15, further comprising:

(3) mapping the logical data cylinder into a logical redundancy cylinder, according to the formula:

ParCyl = (DatCyl/Width) * Width + (Width − Redund)

(4) mapping the logical data cylinder and the column number and the row number of the matrix identifying the data disk drive into a column number and a row number of the matrix identifying a redundancy disk drive, according to the formulae:

ParCol = (DatCyl + DatCol + 1) % Width

NumReg = Depth ** ((Width + Depth − 1)/Depth)

Region = (ParCyl/Width) % NumReg

Angle = Region/Depth

Offset = Region % Depth

DatSide = DatCol/Depth

ParSide = ParCol/Depth

ParRow = (DatRow + Angle * (DatCyl + 1) + (if DatSide < ParSide then Offset else 0) + (if DatSide > ParSide then Depth-Offset else 0)) % Depth wherein:

ParCyl is the logical redundancy cylinder,

ParCol is the column number identifying the redundancy disk drive,

ParRow is the row number identifying the redundancy disk drive,

Depth is a depth of the matrix,

NumReg, Region, Angle, Offset, DatSide, and ParSide are computational terms, and operator "**" indicates exponentiation.

17. The method of claim 15, further comprising:

(3) mapping the logical data cylinder into a logical redundancy cylinder, according to the formula:

ParCyl = (DatCyl/Width) * Width + (Width − Redund)

(4) mapping the logical data cylinder and the column number of the matrix identifying the data disk drive into a column number of the matrix identifying a redundancy disk drive, according to the formula:

ParCol = (DatCyl + DatCol + 1) % Width (5) mapping the logical data cylinder and the row number of the matrix identifying the data disk drive into a row number of the matrix identifying the redundancy disk drive, according to the formulae:

NumReg = Depth ** ((Width + Depth − 1)/Depth)

Region = (DatCyl/Width) % NumReg

ParRow = (DatRow + Region * (DatCyl + 1)) % Depth wherein:

Redund is equal to 1,

Depth is a depth of the matrix and is a prime number,

Width is less than or equal to the Depth, but not less than 2,

ParCyl is the logical redundancy cylinder,

ParCol is the column number identifying the redundancy disk drive,

ParRow is the row number identifying the redundancy disk drive,

NumReg and Region are computational terms, and operator "**" indicates exponentiation.

18. The method of claim 15, further comprising:

(3) mapping the logical data cylinder into a logical redundancy cylinder, according to the formula:

$ParCyl = (DatCyl/Width) * Width + (Width - Redund)$ (4) mapping the logical data cylinder and the column number of the matrix identifying the data disk drive into a column number of the matrix identifying a redundancy disk drive, according to the formula:

$ParCol = (DatCyl + DatCol + 1) \% Width$ (5) mapping the logical data cylinder and the row number of the matrix identifying the data disk drive into a row number of the matrix identifying the redundancy disk drive, according to the formulae:

$NumReg = Depth ** ((Width + Depth - 1)/Depth)$
$Region = (DatCyl/Width) \% NumReg$
$Angle = Region/Depth$
$Offset = Region \% Depth$
$DatSide = DatCol/Depth$
$ParSide = ParCol/Depth$
$ParRow = (DatRow + Angle * (DatCyl+1) + (if\ DatSide < ParSide\ then\ Offset\ else\ 0)) + (if\ DatSide > ParSide\ then\ Depth - Offset\ else\ 0)) \% Depth$ wherein:

Redund is equal to 1,

Depth is a depth of the matrix and is a prime number,

Width is greater than the Depth, but less than or equal to twice the Depth,

ParCyl is the logical redundancy cylinder,

ParCol is the column number identifying the redundancy disk drive,

ParRow is the row number identifying the redundancy disk drive,

NumReg, Region, Angle, Offset, DatSide, and ParSide are computational terms, and operator "**" indicates exponentiation.

19. The method of claim 15, further comprising:

(3) mapping the logical data cylinder into a logical parity cylinder and a logical quotient cylinder, according to the formulae:

$ParCyl = (DatCyl/Width) * Width + (Width - 1)$
$QuoCyl = (DatCyl/Width) * Width + (Width - 2)$ (4) mapping the logical data cylinder and the column number of the matrix identifying the data disk drive into a column number of the matrix identifying a parity disk drive and a column number of the matrix identifying a quotient disk drive, according to the formulae:

$ParCol = (DatCyl + DatCol + 1) \% Width$
$QuoCol = (DatCyl + DatCol + 2) \% Width$ (5) mapping the logical data cylinder and the row number of the matrix identifying the data disk drive into a row number of the matrix identifying the parity disk drive and a row number of the matrix identifying the quotient disk drive, according to the formulae:

$NumReg = Depth ** ((Width + Depth - 1)/Depth)$
$Region = (DatCyl/Width) \% NumReg$
$ParRow = (DatRow + Region * (DatCyl+1)) \% Depth$
$QuoRow = (DatRow + Region * (DatCyl+2)) \% Depth$ wherein:

Redund is equal to 2,

Depth is a depth of the matrix and is a prime number,

Width is less than or equal to the Depth, but not less than 4,

ParCyl is the logical parity cylinder,

ParCol is the column number identifying the parity disk drive,

ParRow is the row number identifying the parity disk drive,

QuoCyl is the logical quotient cylinder,

QuoCol is the column number identifying the quotient disk drive,

QuoRow is the row number identifying the quotient disk drive,

NumReg and Region are computational terms, and operator "**" indicates exponentiation.

20. The method of claim 15, further comprising:

(3) mapping the logical data cylinder into a logical parity cylinder and a logical quotient cylinder, according to the formulae:

$ParCyl = (DatCyl/Width) * Width + (Width - 1)$
$QuoCyl = (DatCyl/Width) * Width + (Width - 2)$ (4) mapping the logical data cylinder and the column number of the matrix identifying the data disk drive into a column number of the matrix identifying a parity disk drive and a column number of the matrix identifying a quotient disk drive, according to the formulae:

$ParCol = (DatCyl + DatCol + 1) \% Width$
$QuoCol = (DatCyl + DatCol + 2) \% Width$ (5) mapping the logical data cylinder and the row number of the matrix identifying the data disk drive into a row number of the matrix identifying the parity disk drive and a row number of the matrix identifying the quotient disk drive, according to the formulae:

$NumReg = Depth ** ((Width + Depth - 1)/Depth)$
$Region = (DatCyl/Width) \% NumReg$
$Angle = Region/Depth$
$Offset = Region \% Depth$
$DatSide = DatCol/Depth$
$ParSide = ParCol/Depth$
$QuoSide = QuoCol/Depth$
$ParRow = (DatRow + Angle * (DatCyl+1) + (if\ DatSide < ParSide\ then\ Offset\ else\ 0) + (if\ DatSide > ParSide\ then\ Depth - Offset\ else\ 0)) \% Depth$
$QuoRow = (DatRow + Angle * (DatCyl+2) + (if\ DatSide < QuoSide\ then\ Offset\ else\ 0) + (if\ DatSide > QuoSide\ then\ Depth - Offset\ else\ 0)) \% Depth$ wherein:

Redund is equal to 2,

Depth is a depth of the matrix and is a prime number,

Width is greater than the Depth but less than or equal to twice the Depth,

ParCyl is the logical parity cylinder,

ParCol is the column number identifying the parity disk drive,

ParRow is the row number identifying the parity disk drive,

QuoCyl is the logical quotient cylinder,

QuoCol is the column number identifying the quotient disk drive,

QuoRow is the row number identifying the quotient disk drive,

NumReg, Region, Angle, Offset, DatSide, ParSide, and QuoSide are computational terms, and operator "**" indicates exponentiation.

* * * * *